United States Patent Office 3,135,979
Patented June 9, 1964

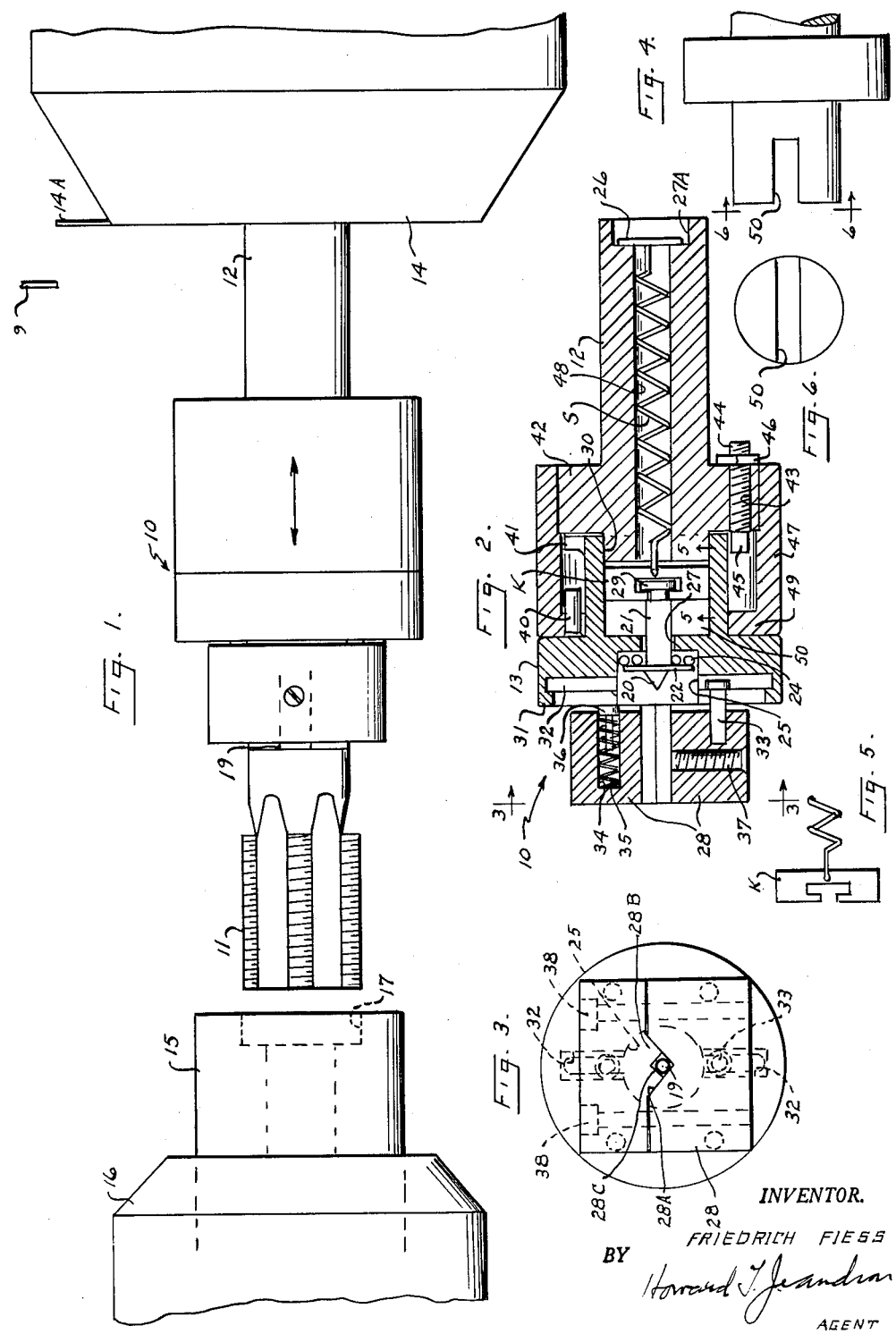

3,135,979
SELF-ALIGNING TAP HOLDER
Friedrich W. Fiess, Astoria, N.Y., assignor to
Max Fiess, Red Bank, N.J.
Filed July 12, 1961, Ser. No. 125,033
5 Claims. (Cl. 10—129)

This invention relates to a self-aligning tap holder for precision tapping, and more particularly a tap holding tool that will automatically align itself with the aperture in the work to be tapped, even though a slight misalignment between the axis of the aperture and the axis of the tool may exist.

The present invention relates to a tool holder for performing tapping operations; more particularly the tool is held in a turret of a turret lathe. The work rotates and the turret is advanced. The turret may be advanced to any predetermined depth and the tap will automatically align with the aperture as it is advanced into the work to provide a perfect tapping operation.

In the past there have been a great many attempts at providing tool holders with readily adjustable aligning means. The average tool holder of this type requires a great deal of careful adjustment to provide a perfect tapping operation. The attempts in the past to provide a flexible self-aligning tool holder have also had their defects. One of the difficulties with previous tap holders is the misalignment which produces a tendency for the tap to wobble, which in turn produces a tapping of the aperture slightly oversize at the entering edge, but reduces its misalignment as it moves into the aperture. This leaves a bell mouth formation. Another defect found with the various taps shown in the prior art is to provide a tapping in which there is a misalignment, and the tap tends to cut oversize at one section of the aperture while cutting undersize at another area of the aperture. A further defect found in the prior tap holders is in controlling the depth of the tapping operation, many of the tap holders are entirely dependent upon the stop on the turret and do not have any safety factor built into the tap holder to guard against tapping deeper than intended, nor do they have any adjustment within the tap holder to permit varying the depth of tapping with different apertures.

A still further defect that may be found with many of the taps in the prior art is the necessity of providing a bushing with the tap to hold the shank of the tap in alignment, this means a different bushing with each different size tap.

It is an object of this invention to provide a simple and effective tool holder capable of performing a self-aligning tapping operation.

It is a further object of this invention to provide a tool holder that can be effectively used with a turret lathe, in which the tool is retained by the turret in a stationary position while the work is rotated by the lathe chuck and the turret is then advanced toward the work to permit the tap to find a perfect alignment with the aperture and provide a perfectly centered tapping operation.

A further object of this invention is to provide a tap holder that can be used with a turret lathe in which the turret is provided with a stop to indicate the depth of the tapping and the tool holder is provided with an adjustable stop to prevent any further tapping.

A still further object of this invention is to provide a tap holder that can be used with a turret lathe in which the tap is provided with a tapping tool that automatically engages in its tapping drive and automatically engages during its reversed disengaging drive.

A further object of this invention is to provide a tap holder that can be used with a turret lathe in which the tap is provided with floating jaws to eliminate all bushings yet permit adjustment for different size tap shanks.

Other objects of this invention may be apparent by reference to the accompanying detailed description and the drawings, in which FIG. 1 illustrates a composite view of the tap and tool holder mounted in a turret in alignment with the work to be tapped, FIG. 2 is a cross sectional view of the tool holder, FIG. 3 is an end view taken on line 3—3 of FIG. 2.

FIG. 4 is a plan view of a portion of the shank end of the tap shown in FIG. 2,

FIG. 5 is a side elevational view of the sliding key shown at 5—5 in FIG. 2, and FIG. 6 is an end view taken on line 6—6 of FIG. 4.

Referring to the drawings, and particularly FIG. 1, there is illustrated the self-aligning tap holder 10, in which a tap 11 is mounted. The tap holder 10 is in turn mounted by its shank 12 in the chuck 14 of a turret. The work piece 15 that is to be tapped is in turn mounted on the same central axis of the tap and retained in a lathe chuck 16. In this particular embodiment, the lathe chuck 16 rotates, which in turn rotates the work piece 15, while the turret 14 does not rotate; it remains stationary, holding the tap holder 10 and tap 11 in a stationary aligned position. Of course, the turret may be moved left or right to feed the tap into the work piece 15, and retract the tap from the work when the tapping operation has been completed.

Referring to FIG. 2, there is illustrated a cross-sectional view of the tap holder 10. The tap holder 10 will retain the tap 11 so that the tap 11 will automatically align itself with the aperture 17 in the work piece 15. In a setting up operation for tapping it is extremely difficult to set the tap 11 in perfect alignment with the aperture 17 in all of the presently known tap holders. However, in this invention, the tap holder 10 is comprised of a shank portion 12, a rotatable forward portion 13 of the tap and a pair of floating jaws 28. The tap 10 provides a positive center 20 for feeding the tap 11 into the aperture 17, but the center 20 is a floating pin 21 retained in the tap by a sliding T shaped key K which is in turn held by a spring S mounted in a bore 48 of the shank 12. The center 20 has a collar 22 which is mounted against ball bearings 24 which in turn bear against the bottom of a recess 25 in which the collar is mounted. Recess 25 is cut into one end of the rotatable body 13. A smaller bore 27 is also cut into the same end of body 13 to permit the floating pin 21 to float with its collar 22 upon the ball bearings and its opposite end freely rotatable but retained by a sliding key "K." Sliding key "K" is mounted to slideably ride in a keyway 50 formed in the tap end of the shank 12. The sliding key "K" is in turn retained by one end of the spring S mounted in bore 48. The opposite end of spring S is retained by a in 26 mounted in a recess 27A in the end of shank 12. It is to be noted that shank 12 does not rotate therefore the spring S does not rotate and the sliding T shaped key "K" does not rotate. However the end of the floating pin 21 mounted through bore 27 is provided with a collar 29 and is free to rotate. The rotatable forward portion 13 will thus be retained in the position illustrated in FIG. 2 due to the spring S. The rotatable forward portion 13 is provided on one end with a recess or bore 30 of a diameter to permit the sliding key "K" to slide or reciprocate within the recess or bore 30. Portion 13 on its opposite end to the bore 30 is formed with an enlarged collar 31. The collar 31 on its external face is provided with a recess 25 and referring to FIGS. 2 and 3 there are a pair of slots 32 extending upward and downward from the recess 25. Slots 32 are provided to slideably retain the heads of a pair of press fit driving dogs or pins 33. One pin is mounted by a press fit into each of the two floating jaws 28. Thus the jaws 28 will be movable toward or away from each other by means of the slots 32. The slots 32 are not simply recesses rather they are cut with a larger internal diameter so that the enlarged end of the pins or dogs 33 may be slipped into the slot from the recess end 25 and are slideably retained in the slot and retain the jaws 28 in the same slideable relationship to the portion 13. The upper and lower jaws 28 are separable to permit mounting the shank end of a tap 11. The jaws 28 in fact act as a bushing to retain the shank in its centering alignment with the positive center 20. In order that the jaws 28 may provide a certain degree of universal movement, each jaw is provided with a pair of recesses 34 and a spring 35 is mounted in each recess 34 and at the open end of the recess a plug or pin 36 is mounted, pin 36 being reciprocal with a sliding fit in the recess 34. Thus with the jaws retained by pins 33 to portion 13, the springs in recesses 34 will force pins 36 against the face of portion 13 retaining the jaws in a floating position as illustrated. However due to the predetermined setting of the jaws from the face of the collar portion 31 of portion 13 any misalignment of the tapping tool will permit the jaws to move in a universal movement while the tap is retained on a positive center 20 until the tap has found its exact center as it is advanced into the aperture 17 in the work piece 15. It is to be noted that there is a set screw 37 in one jaw as the means of retaining the shank of the tap. It is also to be noted that there are two set screws 38 between the two jaws to permit setting the jaws according to the size of the shank of the tap. Referring to the shank 12 at its connected end, it is provided with an enlarged end or collar 42 and a ring portion 47. Portion 47 extends toward the rotatable portion 13 and is provided with a hub portion 49 against which the rotatable portion bears. It is to be noted that there is a driving dog 40 extending inward from the hub portion 49 toward the shank end of the tool and positioned above the recessed area 30. Also at the extreme end of portion 13 adjacent the shank end of the tool there is a raised portion 41 provided as the driving element or dog. Referring back to the shank portion 12 one end of which is formed as a collar or enlarged portion 42 and through this enlarged portion there is a bore 43 which is threaded to receive an adjustment screw 44. One end of screw 44 is a flat face 45 which in operation may be the stop for the dog 41 when the tap and portion 13 are rotated clockwise. This stop is adjustable due to the threaded element 44, that is, the exact degree of its projection from the face 45 of the collar portion 42 determines the number of threads the tap will make or cut before the dog 41 advances with portion 13 away from the shank end 12 to be freely rotatable and thus stop further tapping operation while continuing to rotate. The dog 45 may be set in any desired position with the locknut 46.

Referring to FIG. 1 it is apparent that the tap 11 may be varied in size, that is, the shank may vary and the jaws 28 are adjustable, the lower jaw being provided with a V shaped cutout 28A while the upper jaw 28 is provided with a mating projection 28B and the apex of this projection is also cut in the V shape 28C. FIG. 3 shows the jaws 28 closed upon the smallest size shank 19. A larger shank would be similarly gripped at four points in the circumference of the shank. Thus when the set screws 38 are tightened, the jaws 28 will firmly grip the shank 19 of the tap 11. The tap 11 is of course centered on the floating center 20 which is a positive center before the jaws are set. Thus the tap is ready for a tapping operation. In this position, the tap cannot be thrown out of alignment but due to the universal movement provided by jaws 28, the tap may be advanced into the aperture 17 and tap 11 will automatically adjust to the aperture 17 to provide a perfect tapping operation. When the tap holder 10 is advanced forward by the turret 14, the workpiece 15 is rotating (clockwise). The tap holder 10 will be as illustrated in FIG. 2 with the rotatable forward portion 13 abutting with the hub portion 49 of portion 47 and in this position when the tap 11 bears against the rotating workpiece 15 the tap 11 will also rotate or start to rotate with the workpiece 15. However as soon as portion 13 starts to rotate the dog 41 will abut with the stop 45 and cannot rotate further. Thus the tap 11 will be retained in this stopped position while the workpiece 15 rotates and the chuck 14 may be advanced forward during the tapping operation. In order that the tap may be stopped when it has completed the depth of tapping required, the chuck 14 is provided with a stop 14A on its face and an adjustable mating stop 9. The stop 9 must be set for the desired depth of thread thus the tap holder 10 and chuck 14 will move forward until 14A abuts with the stop 9 completing the tapping operation. To insure the exact depth of tapping, the tap holder 10 is provided with the adjustable screw 44 to permit setting the degree of projection of the stop face 45. With this adjustable means the tap holder may be set to provide a tapping of one or more threads into an aperture 17, that is, by adjusting the projection of face 45 to the predetermined amount for each thread desired, the tap 11 will be retained in its stationary tapping position with the dog 41 against face 45 but as tap 11 is drawn into aperture 17 due to its rotation and grip on the already cut threads, the turret 16 will draw tap 11 forward as long as dog 41 abuts with stop 45. And of course in this instance stop 14A must be abutting stop 9 so that the chuck cannot advance the tap further but the tap will advance pulling the rotating portion 13 forward with the advancing tap 11 until dog 41 moves to the end of the stop face 45 when dog 41 will be free of stop face 45 and portion 13 will then rotate with the workpiece 15 and the tap operation will cease. The reverse operation is of course the movement of the chuck 14 to the right, FIG. 1, thus shank 12 and its extended portion 47 and hub portion 49 will move with chuck 14. This moves the tap release driving dog 40 into the path of the rotating dog 41. In the movement of chuck 14 to the right, the workpiece must be rotated in an opposite direction (counter-clockwise). Dog 40 will remain in contact with dog 41 until tap 11 has released itself from the threaded aperture 17 due to the pull of spring "S," that is spring "S" is pulling on the sliding T key "K" which in turn is pulling on the floating pin 21 which in turn is pulling on the forward portion 13; thus portion 13 will be pulled back into the position as illustrated in FIG. 2. It is to be noted that the sliding T key "K" is mounted in the slot 50 and is movable in this slot but is retained in a particular position by spring "S" exerting a pull on the floating pin 21 allowing pin 21 to ride entirely upon the ball bearings. The T shaped cut out portion of key "K" provides a grip on the collar 29 of pin 21. It is also to be noted that key "K" does not interfere with the sliding movement of the forward portion 13 as the key "K" rides freely in the recess or bore 30.

The tap holder 10 described herein may be used on any machine with a reversible spindle and it may be used with either the automatic or hand feed turrets. As already described, the tap holder 10 permits either a left hand or a right hand tap to be used—both operations being identical, being moved forward while rotating in one direction and being released from the work while rotating in the opposite direction.

It is also apparent that any size tap may be mounted in the tap holder 10. When the shank 19 of the tap rests upon the center 20, the shank is gripped by the jaws 28, and, as already explained, the tap holder 10 may be provided with a male or female centering pin to match the end of the tap provided. Various changes in the size of the tap holder may be made, without departing from the spirit of this invention, and this invention shall be limited only by the appended claims.

What is claimed is:

1. The combination of a rotatably driven workpiece, a tap, a tap holder and a feeding turret to hold said tap holder, said tap holder comprising a forward and rearward divided body section, said forward section provided with a dog, said rearward section provided with a stop for said dog to engage the rearward section being reciprocable but non-rotatively retained by said turret, the forward section supported by the rearward section and being rotatably movable when said dog is disengaged from said stop and said forward section including a chuck for securing said tap in its forward end, said forward section also including a floating positive center that is non-rotative and resiliently retained on a bearing in said rotatable forward section, said rearward section providing the means to mount the tap holder in said feeding turret for reciprocable movement only, said turret providing a non-rotative feeding movement for said rearward body section of said tap holder, said chuck in said forward section provided with a pair of jaws mounted forward of the body section and each jaw resiliently urged away from said forward section of the tap holder by a pair of spring pressed slidable plugs that are adjacent the edge of said jaws, a pair of chuck retaining pins having heads slidably mounted in a longitudinal recess in the center of the forward end of said forward section, said recess having an actual depth greater than the thickness of the head of said pins and each pin connected to a jaw of said chuck on either side of the center of said chuck to allow universal movement of said chuck at its outer edge during rotation, said tap mounted in said chuck to bear with one end against said floating positive center and be retained on said floating positive center during rotation, and at its opposite end movable with the universal movement of said chuck as it enters said rotatably driven workpiece.

2. In a device according to claim 1, in which said positive center is a floating pin riding on a plurality of ball bearings, said floating pin having an enlarged collar adjacent the positive center and resiliently supported by said rearward section and extending through an opening larger than said pin in the forward section, said forward section provided with an enlarged opening to provide a shoulder surrounding said opening for said pin, said ball bearings mounted on said shoulder surrounding said pin and said enlarged collar of said floating pin resiliently bearing on said ball bearings to allow said positive center a degree of universal movement for engagement with said tap.

3. In a device according to claim 1, in which said positive center is a male floating pin to fit into a centering orifice in said tap, said floating pin having an enlarged collar adjacent the positive center and resiliently supported by said rearward section and extending through an opening larger than said pin in the forward section, said forward section provided with an enlarged opening to provide a shoulder surrounding said opening for said pin, said ball bearings mounted on said shoulder surrounding said pin and said enlarged collar of said floating pin resiliently bearing on said ball bearings to allow said positive center a degree of universal movement for engagement with said tap.

4. In a device according to claim 1, in which said forward body section is resiliently mounted to said rearward section to permit movement toward and away from said rearward section and in which said rearward section normally engages said forward body section to prevent rotation when tapping, said engagement provided by means of said stop on said rearward section and said dog on said forward body section, said stop and said dog axially positioned to rotate into engagement with relation to each other, and in which the resilient mounting of said forward body section retains engagement of said dog with said stop during a feeding tapping operation and the disengagement of said dog from said stop when the forward body section moves away from the rearward section when the tapping operation is completed and the tap has reached a predetermined depth in said workpiece.

5. In a device according to claim 1, in which said body section is resiliently mounted to said rearward section to permit movement forward and away from said rearward section and in which said rearward section normally engages said forward body section to prevent rotation when tapping, said engagement provided by means of said adjustable stop on said rearward section and said dog on said forward body section, said adjustable stop and said dog axially positioned to rotate into engagement with relation to each other, and in which the resilient mounting of said forward body section retains engagement of said dog with said stop during a feeding tapping operation and the disengagement of said adjustable dog at a predetermined depth when the forward body section moves away from the rearward section when the tapping operation is completed.

References Cited in the file of this patent

UNITED STATES PATENTS

| | | |
|---|---|---|
| 399,447 | Reid | Feb. 26, 1889 |
| 2,429,564 | Peterson | Oct. 21, 1947 |
| 2,450,238 | Jordan | Sept. 28, 1948 |
| 2,807,812 | Wozniak | Oct. 1, 1957 |

FOREIGN PATENTS

| | | |
|---|---|---|
| 25,321 of 1901 | Great Britain | May 1, 1902 |